United States Patent [19]
Rupp

[11] 3,860,034
[45] Jan. 14, 1975

[54] SLIDE VALVE

[75] Inventor: Warren E. Rupp, Mansfield, Ohio

[73] Assignee: The Warren Rupp Company, Mansfield, Ohio

[22] Filed: June 28, 1973

[21] Appl. No.: 374,478

Related U.S. Application Data

[62] Division of Ser. No. 199,250, Nov. 16, 1971, Pat. No. 3,782,863.

[52] U.S. Cl. .................. 137/625.25, 137/625.68
[51] Int. Cl. ............................................ F16k 11/06
[58] Field of Search ....... 137/625.25, 625.68, 625.2, 137/625.11, 625.12, 625.17, 625.66, 625.47, 625.48, 627, 627.5, 628, 629, 565, 565.2, 566, 568, 624.14; 417/393, 395, 403, 404, 397; 91/329, 344, 347

[56] References Cited
UNITED STATES PATENTS

| | | | |
|---|---|---|---|
| 255,222 | 3/1882 | Wang | 417/393 |
| 1,360,396 | 11/1920 | Havens | 137/625.68 |
| 1,697,911 | 1/1929 | Gustafson | 137/625.25 X |
| 2,307,566 | 1/1943 | Browne | 417/393 |
| 2,625,886 | 1/1953 | Browne | 417/393 |
| 2,792,785 | 5/1957 | Haydon | 417/393 |
| 2,798,440 | 7/1957 | Hall | 417/359 X |

*Primary Examiner*—Martin P. Schwadron
*Assistant Examiner*—Robert J. Miller
*Attorney, Agent, or Firm*—Bosworth, Sessions & McCoy

[57] ABSTRACT

An air-operated double diaphragm pump having a pair of power fluid chambers and a control valve for directing air alternately to each chamber while permitting air to exhaust from the other chamber. The valve includes an elongated member and a second member slidably mounted in fluid tight sealing contact on an elongated member. A flexible conduit is connected at one end to a port in the slidable member and at its other end to a source of fluid under pressure. In one valve position the slidable member establishes a fluid supply path from the flexible conduit through the port in the slidable member in alignment with a port in the elongated member communicating only with one power fluid chamber, and a fluid exhaust path through another port in the elongated member communicating only with the second power fluid chamber of the pump and the atmosphere. In a second position a fluid supply path is established to the second power fluid chamber through the port in the slidable member and the other port in the elongated member, and a fluid exhaust path from the first power fluid chamber through the first port in the elongated member to the atmosphere. In intermediate position of the slidable member no fluid paths are provided. A link arrangement operated by reciprocations of the pump rapidly moves the slidable member to and between these positions.

12 Claims, 5 Drawing Figures

PATENTED JAN 14 1975
3,860,034
SHEET 1 OF 2
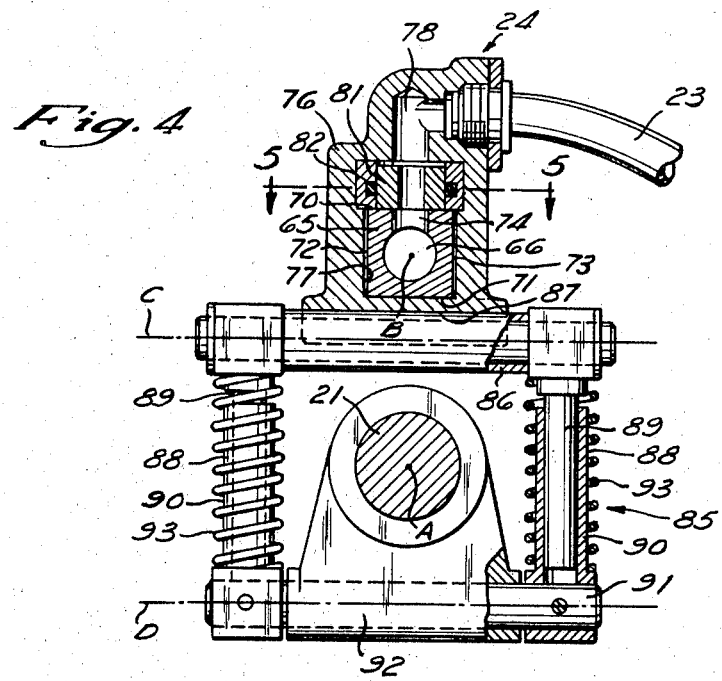
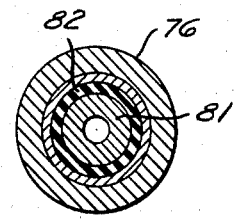
Fig.4
Fig.5
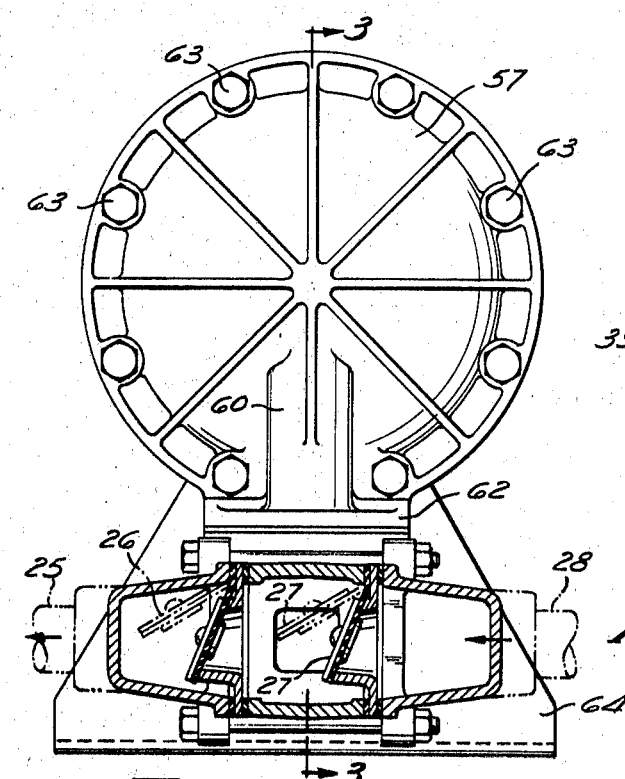
Fig.2
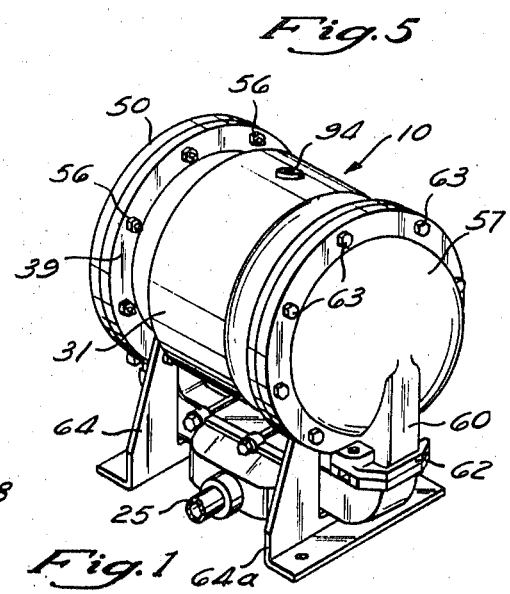
Fig.1

SLIDE VALVE

CROSS REFERENCE TO RELATED APPLICATION

This application is a division of applicant's U.S. Pat. application Ser. No. 199,250 filed Nov. 16, 1971, now U.S. Pat. No. 3,782,863.

BACKGROUND OF THE INVENTION

This invention relates to valves controlling the flow of fluid and more particularly to slide valves of novel construction that are particularly well adapted to control the flow of fluid under pressure to and from the power fluid chamber of a pump of the reciprocating type.

While the invention may be advantageously used for various purposes, the invention provides particular advantages in and will be discussed below in connection with air actuated diaphragm pump apparatus having a reciprocating diaphragm for pumping liquid such as solutions, viscous materials, slurries, or suspensions containing substantial amounts of solids (the word "liquid" used herein being intended to include all such materials).

In such pump apparatus a diaphragm forming a movable wall of a pumping chamber is moved in a suction stroke to draw into the pumping chamber liquid to be pumped by means such as another diaphragm associated with another chamber. The diaphragm is then moved in the opposite direction in a pumping stroke to force the liquid out of the pumping chamber by pressurized air acting directly on the diaphragm.

The invention provides exceptional advantages when used in a double diaphragm pump in which two diaphragms are connected together by a connecting rod, each diaphragm having on one side of it a pumping chamber and on the other side a power fluid chamber, and in which air under pressure is alternately introduced into and exhausted from each power fluid chamber under the control of a valve embodying the invention, the apparatus being so designed that air is introduced under pressure into one power fluid chamber to cause the associated diaphragm to move in a pumping stroke while the connecting rod pulls the other diaphragm in a suction stroke and causes air in its associated power fluid chamber to be forced out of such power fluid chamber, after which air under pressure is introduced into the other power fluid chamber to move its diaphragm in a pumping stroke and force air that is in the first power fluid chamber to be exhausted and so on.

A valve for thus controlling the introduction of air under pressure into each power fluid chamber and for permitting the exhausting of air from each power fluid chamber at the proper time should be dependable and accurate in operation and leak-proof to prevent loss of air under pressure. It also desirably should be simple and rugged in construction and require little maintenance. It also preferably should be of the type that when air is introduced into the valve, the pump will automatically start operating and cease to operate when the supply of air is cut off.

Prior valves in general have not provided these features and advantages to the degree desired. Many of them are quite complicated in construction. Many require considerable maintenance. Many do not provide the degree of accuracy of operation that is desired.

SUMMARY OF THE INVENTION

A general object of this invention is to provide an improved control valve, particularly advantageous for fluid operated reciprocating pumps, that overcomes the disadvantages noted above in prior valves.

Another object is the provision of such a valve that is simple in construction and can be manufactured economically and that will be long-lived and reliable in service.

A further object is the provision in a pump of the air-operated diaphragm type of such a valve in conjunction with compressible link means operated by reciprocations of the pump for snapping the valve from one position where it permits fluid flow as into a power fluid chamber of a pump to another position where it cuts off such flow and if desired permits exhausting of fluid from such chamber.

The foregoing and other objects and advantages of the invention may be attained by the provision of a control valve comprising a first member which is elongated and has an outer slide surface of substantial length and an inner fluid passage communicating with a port in the outer surface and also with an opening in the first member spaced longitudinally from the port, a second member which is slidably mounted on the outer slide surface of the first member and has a fluid passage with a port adapted to be put into communication with the port in the first member in fluid-tight sealing engagement, and a flexible conduit communicating at one end with the port in the second member and adapted to communicate at its other end with a source of fluid under pressure. The ports are arranged so that the second member may be slidably positioned on the first member in a first position in which the port of the first member and the port of the second member are in communication and provide a fluid path extending through the flexible conduit and the ports and the passages and the opening, and also in a second position in which the ports do not communicate and which provides a fluid path extending through the opening, the passage, and the port of the first member and outside of the flexible conduit.

Preferably, the slide surface is flat. Furthermore, preferably, the slide surface forms part of a portion of the elongated member of uniform cross section on which the slide member slides and around which the slide member extends, this portion of uniform cross section and the mating surface of the slide member being shaped to prevent transverse movement such as rotational movement of the slide member relative to the elongated member.

Preferably, the elongated member has a second fluid passage with a second port and with a second opening in the elongated member. The port in the second member is adapted to be aligned with the port in the second fluid passage of the elongated member when the members are in the second position. The slidable second member is then reciprocated so that it establishes in the first position a fluid path through the flexible conduit and slidable member to the first passage in the elongated member and simultaneously establishes an exhaust path from the second fluid passage in the elongated member through the second port to the outside of the flexible conduit; and so that it establishes in the second position a fluid path through the flexible conduit and slidable member to the second fluid passage in the elongated member and simultaneously establishes an exhaust path from the first fluid passage in the elongated member through the first port to the outside of the flexible conduit.

In a fluid-operated reciprocating pump employing the valve, means are preferably provided by reciprocation of a pump rod for sliding the slidable member with respect to the other elongated member from and to a first position establishing a fluid path through the flexible conduit and the ports in the two members to a power fluid chamber in the pump, and to and from a second position providing a fluid path from the power fluid chamber through the port in the elongated member outside of the flexible conduit.

In a double pump having two power fluid chambers defined in part by a reciprocable members such as diaphragms, a slidable valve when in one position on the elongated member establishes a fluid supply path through the flexible conduit, the slidable member, a first port and a first passage in the elongated member to a first power fluid chamber, while establishing a fluid exhaust path from the second power fluid chamber through a second passage and second port to the atmosphere; and in a second position the slidable member establishes a fluid supply path through the flexible conduit, the slidable member, the second port and a second passage in the elongated member to the second power fluid chamber, while establishing a fluid exhaust path from the first power fluid chamber through the first port and first passage to the atmosphere.

BRIEF DESCRIPTION OF THE DRAWINGS

Referring to the drawings:

FIG. 1 is a perspective to a small scale of a double diaphragm pump apparatus embodying the invention;

FIG. 2 is a view to a larger scale of the apparatus of FIG. 1 on the line 2—2 of FIG. 3, showing in section a set of inlet and outlet valves for fluid being pumped;

FIG. 4 is a section along line 4—4 of FIG. 3 and to a larger scale showing the air control valve of the illustrated apparatus; and FIG. 5 is a section along line 5—5 of FIG. 4 and to the same scale.

DESCRIPTION OF A PREFERRED EMBODIMENT

Figure 3:
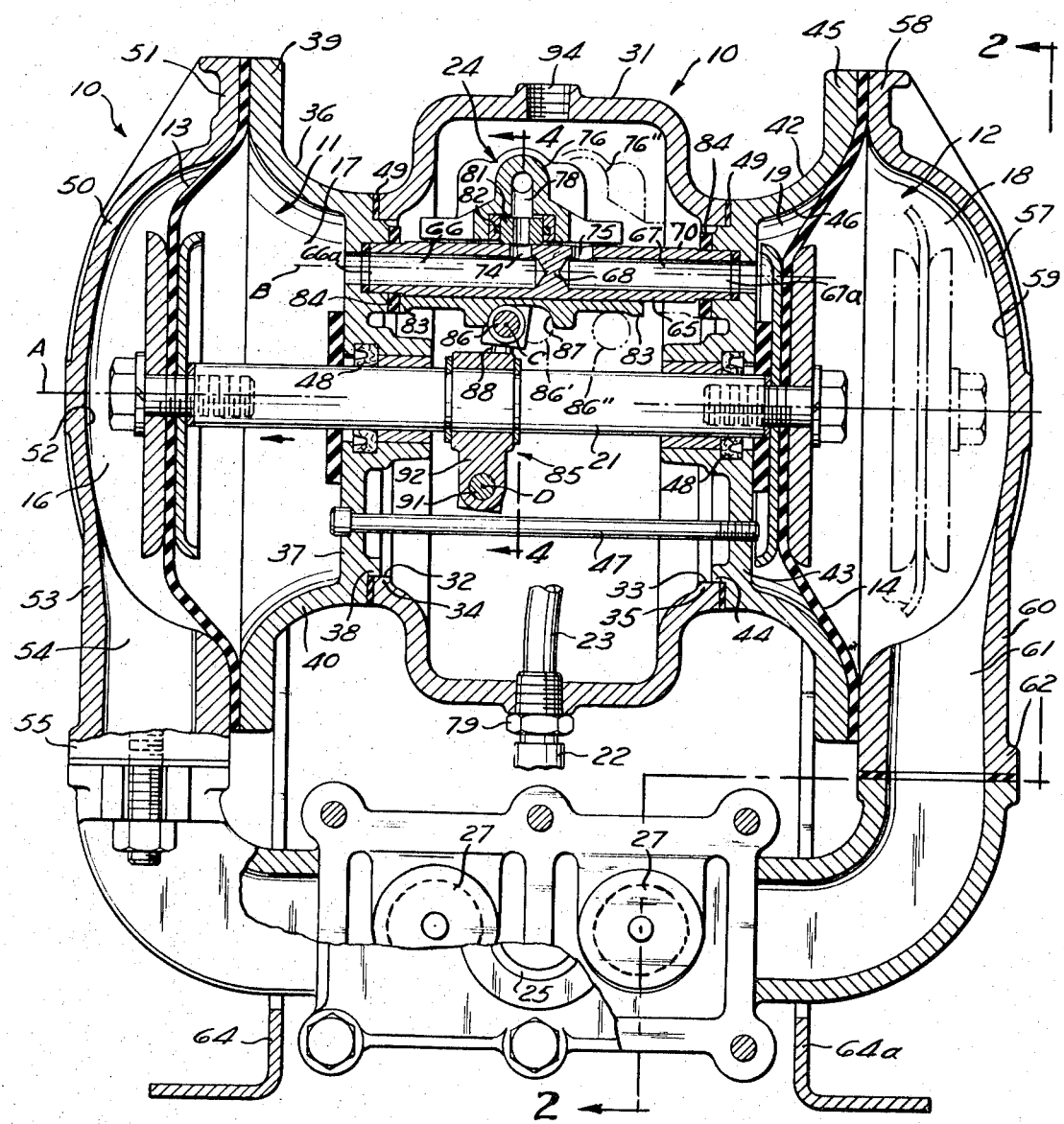
FIG. 3 is a cross section to a larger scale than any of the preceding Figures through the pump apparatus from line 3—3 of FIG. 2.

Referring to the drawings, the invention is disclosed as adapted to an air-operated diaphragm pump apparatus indicated in general at 10. Apparatus 10 embodies two diaphragm chambers 11 and 12, respectively (FIG. 3) divided by diaphragms 13 and 14 into a pumping chamber 16 and a power fluid chamber 17, and into a pumping chamber 18 and a power fluid chamber 19. The diaphragms are connected to a connecting rod 21 so that the diaphragms reciprocate together.

Air is admitted alternately into power fluid chambers 17 and 19, the air being supplied from any suitable source such as conduit 22 through flexible conduit 23 and control valve 24 that is operated by reciprocation of connecting rod 21 to admit air at a suitable pressure alternately to power fluid chambers 17 and 19. The diaphragms are reciprocated in unison. In FIG. 3 the pump apparatus is shown with the diaphragm 13 at the end of its pumping stroke and diaphragm 14 at the end of its suction stroke, both diaphragm and connecting rod moving to the left as indicated by the arrow, pressurized air being admitted to the power fluid chamber 17 and liquid being discharged from pumping chamber 16 to outlet conduit 25 through an outlet check valve 26. Simultaneously, by movement of diaphragm 14, air in power fluid chamber 19 is permitted by valve 24 to discharge to the atmosphere, and liquid to be pumped is drawn into pumping chamber 18 through an inlet check valve 27 from a suitable source of liquid such as conduit 28 (FIG. 2). Each pumping chamber has a set of valves 26 and 27, those shown in FIG. 2 being for pumping chamber 18.

At the end of the stroke, the valve 24 quickly causes the air connections to be reversed so air under pressure is then supplied to power fluid chamber 19 while air in fluid power chamber 17 is permitted to exhaust to atmosphere so that both diaphragms are moved to the other direction. Liquid is then discharged from pumping chamber 18 past its outlet check valve 26 (FIG. 2) through outlet conduit 25, while liquid to be pumped is drawn into pumping chamber 16 through inlet conduit 28 past the inlet check valve 27 for that pumping chamber. The cycle is continued so long as air is supplied to conduit 23 and liquid is allowed to flow from conduit 25.

More specifically, in the embodiment illustrated in the drawings, a central housing 31 generally circular about axis A of the connecting rod 21, has end openings 32 and 33 circular about axis A, each having accurately machined intersecting flat radial outer and cylindrical inner surfaces forming projecting inner shoulders 34, 35.

At opening 32 housing 31 supports a generally concave member 36 circular in cross section about axis A, having a radial wall 37 carrying radial and axial surfaces defining a re-entrant shoulder 38 fitting shoulder 34 of the housing, a circular outwardly extending flange 39 clamping the diaphragm, and an intermediate concave wall portion 40 shaped to cooperate with diaphragm 13 to form fluid power chamber 17.

At opening 33 housing 31 supports another generally concave member 42 identical with member 36, having a radial wall 43 with shoulder 44 fitting on shoulder 35 of housing 31, a flange 45 clamping diaphragm 14, and an intermediate concave wall portion 46 forming power fluid chamber 19 with the diaphragm.

Members 36 and 42 are held on housing 31 by bolts 47 passing through radial walls 37, 43. Connecting rod 21 is slidably mounted in walls 37, 43, seals 48 providing fluid tight joints. Gaskets 49 at the junctures of housing 31 with members 36 and 42 also provide fluid tight joints.

Member 36 supports a generally concave closure member 50 having a circular flange 51 matching flange 39 of member 36, and a generally concave central portion 52 shaped to cooperate with diaphragm 13 to form pumping chamber 16. Member 50 also includes a generally radially extending conduit portion 53, having a passage 54 for liquid, and terminating in a flanged end 55. Flanges 39 and 51 clamp between them the peripheral portion of diaphragm 13 in a fluid-tight joint by bolts and nuts 56 equiangularly and equidistantly spaced around axis A.

Member 42 supports a diaphragm end closure member 57 identical with member 50, having flange 58, concave central portions 59 cooperating with diaphragm 14 to form pumping chamber 18, and a conduit portion 60 having passage 61 and flanged end portion 62. The outer edge portion of diaphragm 14 is clamped fluid tightly between flanges 45 and 58 by bolts and nuts 63 equiangularly and equidistantly spaced around axis A.

Spaced brackets 64 and 64a for supporting the pump apparatus are bolted by certain of bolts 56, 63 to the flanges 39 and 45.

The control valve 24 that alternately supplies compressed air to and exhausts air from the power fluid chambers 17 and 19 comprises an elongated member 65 (FIGS. 3, 4) that is rigidly fixed fluid-tightly to and spans between the radial inner walls 37 and 43 of member 36 and 42 about an axis B parallel to axis A. Member 65 has two oppositely extending coaxial fluid passages 66 and 67 terminating in ports or openings 66a and 67a the first communicating with power fluid chamber 17, and the other with power fluid chamber 19. Passages 66 and 67 are isolated from each other by central wall 68 in member 65. Member 65 is of uniform generally square external cross section formed of parallel planar smooth upper and lower surfaces 70 and 71 and parallel planar smooth side surfaces 72 and 73 as shown in FIG. 4. Ports in the form of openings 74 and 75 on opposite sides of wall 68 extend respectively from the top surface 70 to the passages 66 and 67 of member 65.

A member 76 is slidably mounted about member 65, having an opening 77 that closely fits around the exterior of member 65. This slidable member has an inner passage 78 with an inlet port connected through a conduit 23, which is flexible and pressure resistant, through a coupling 79 in housing 31 to a suitable source of air under a suitable pressure, as about 125 p.s.i.g. represented by conduit 22. An outlet port from passage 78 is adapted to be brought alternately into communication with ports 74 and 75 connected to power fluid chambers 17 and 19 as member 76 reciprocably slides on member 65. Member 76 includes an apertured sealing member 81 formed of a known material that has good wearing and low friction qualities, such as carbon. Member 81 is sealed fluid tightly to the main body of member 76 by a sealing ring 82. Member 81 maintains a slidable fluid tight joint with the top of member 65, this being aided by the fact that the pressurized air acting on the side of member 81 opposite that contacting member 65 urges member 81 toward member 65, to prevent escape of air between member 65 and slidable member 76. Member 76 also has portions 83 extending along member 65 and proportioned to contact resilient buffers 84 at the ends of elongated member 65 adjacent walls 37 and 43. These buffers 84 and extensions 83 limit movement of the slidable member in either direction on member 65 and position passage 78 alternately in alignment with each of ports 74 and 75.

Slidable member 76 is moved as required by a yoke-shaped telescoping link member 85 the upper end of which has a roller bearing portion 86 extending about axis C transversely of members 65 and 76 and axes A and B, and rides in a groove 87 in the bottom of slidable member 76, the center of the groove being at the center of member 76 and directly below passage 78. Groove 87 is preferably about twice as wide as the diameter of bearing portion 86. Portion 87 is supported by two downwardly extending telescoping members 88 spaced on opposite sides of rod 21. Each member 88 comprises a rod 89 connected to bearing portion 86 and slidable in a tubular portion 90 fixed to another rod 91 that is parallel to bearing portion 86 and located on the other side of connecting rod 21. Rod 91 is pivotally mounted about an axis D on a supporting member 92 fixed to the connecting rod at a predetermined and preferably central location along its length. A spring 93 on each telescoping portion constantly tends to force the bearing portion 86 away from rod 91 and toward the slidable member 76.

The geometry of the parts is such that movement of the connecting rod 21 in its reciprocatory path causes slidable member 76 to move in its reciprocatory path on elongated member 65. As shown in FIG. 3 slidable member 76 is in its left hand position to which it has been forced by bearing portion 86 carried by connecting rod 21. The telescoping members 88 have just passed their over-the-center position in which axis D has passed axis C to the left causing link member 85 to tilt in the direction opposite to the direction of movement of the connecting rod. Thereafter, the force of the springs 93 causes bearing member 86 to move to the other side of the slot 87 to the position shown by broken lines 86' and then rapidly to move member 86 and slidable member 76 from the extreme left hand position shown in full lines in FIG. 3 where member 76 is supplying compressed air through port 74 to the power fluid chamber 17, to the extreme right hand positions shown by the broken lines 76'', 86'' in which member 76 will supply pressurized air through the other port 75 to the other power fluid chamber 19. When in this latter position port 74 is uncovered by member 76 and air in the power fluid chamber 17 is allowed to escape into housing 31 from where it passes out to the atmosphere through the opening 94. While member 76 is in position 76'', the position of member 92 in its over-the-center location relative to member 76, and the action of springs 93 cause member 86 to move to the left and drive member 76 to the left toward the position shown in full lines in FIG. 3.

Air under pressure is continuously available to member 76 through flexible conduit 23 which moves with member 76 so long as air is supplied to that conduit. As long as air is supplied through conduit 23 the slidable member 76 will reciprocate between the ports 74 and 75, alternately supplying air to each power fluid chamber and alternately allowing air to exhaust from each power fluid chamber, the force exerted by the air under pressure supplied to each power fluid chamber causing the diaphragms alternately to move in pumping and suction strokes. Member 76 rapidly moves once it starts, the action being a form of snap action. As the passage 78 of member 76 passes between ports 74 and 75, the air supply is momentarily cut off.

Moreover, the arrangement of the valve parts is such that the sliding member 76 will always stop in one of its extreme positions when the air supply to conduit 23 is cut off, so when air under pressure is again supplied to member 76, the air will pass to one of the power fluid chambers and start the pump apparatus.

In the illustrated apparatus, the slidable member 76 is prevented from moving transversely of elongated member 65, as in a rotational direction about member 65, because the generally square cross section of the slide portion of member 65, in cooperation with the closely fitting generally square openings 77 of member 76, prevents any transverse motion. The cross sectional shapes of member 65 and opening 77 may be of other configuration than square; they may have other mating shapes, preferably polygonal, that will prevent transverse movement of member 76 on member 65.

Other means than the extensions 83 of member 76 and buffers 84 of the pump may be used to accurately limit the reciprocatory stroke of member 76.

Other means than that disclosed may be employed for reciprocating the member 76, although that disclosed has been found highly advantageous, dependable and durable.

The valve 24 could be modified to provide inlet and exhaust paths alternately to only one power fluid chamber of a pump, in which case elongated member 65 need have only a single fluid passage and a single port to the passage that would be opened and closed by the valve.

Changes other than those discussed above will occur to those skilled in the art who come to understand its essential principles and accomplishments.

This invention, therefore, is not to be confined to the specific forms herein specifically disclosed nor in any other way inconsistent with the progress by which the invention has promoted the art.

I claim:

1. A fluid control valve comprising a first member fixed with respect to a support and having an outer slide surface and an internal fluid passage communicating with a port in said slide surface and also with an opening in said first member spaced longitudinally a substantial distance from said port in said first member, a second member slidably mounted on said slide surface of said first member and having a port adapted to be put into communication with said port in said first member in fluid-tight sealing engagement, and a flexible conduit secured at one end to said second member and communicating with said port in said second member and having a portion spaced from said one end and carried by said support, said flexible conduit being adapted to communicate at its other end with a source of fluid under superatmospheric pressure, whereby said second member may be slidably positioned on said slide surface of said first member in a first position in which said port of said first member and only said port of said second member are in communication and provide a fluid path extending through said flexible conduit and said ports and through said passage and said opening in said first member, and also in a second position in which said ports do not communicate and which provides a fluid path extending through said opening, and through said passage and said port of said first member and outside of said flexible conduit.

2. A control valve as in claim 1 wherein said first member is elongated and said opening of said passage is located adjacent an end of said first member.

3. A control valve as in claim 2 wherein said passage in said first member has an outer end adjacent an outer end of said first member and also an inner end spaced from said outer end and wherein said port in said first member communicates with said passage at its inner end.

4. A control valve as in claim 1 in which said first member and said second member include means cooperating to prevent transverse movement of said second member on said first member.

5. A control valve as in claim 1 in which said outer slide surface is flat.

6. A control valve as in claim 4 in which said slide surface is on a portion of said first member of uniform cross section which is shaped in cross section, and the portion of the surface of said second member that slidably engages said portion of uniform cross section of said first member is shaped in cross section to engage the cross section of said first member, so that said second member is prevented from transverse movement on said first member.

7. A control valve as in claim 6 wherein said first member is rectangular in cross section over a substantial length and has flat surfaces defining said length, and said first port comprises an opening in one of said flat surfaces.

8. A control valve as in claim 6 in which said second member extends substantially completely around said first member.

9. A control valve as claimed in claim 1 wherein said first member has a second fluid passage isolated from said first passage with a second port in said slide surface and with a second opening spaced longitudinally a substantial distance from said second port, said port in said second member being adapted to be put into communication with said second port of said first member when said second member is in a second position to establish a fluid path through said flexible conduit, of said communicating port of said second port and said second port of said first member, and said second opening.

10. A control valve as claimed in claim 9 where when said second member is in said second position said first and second members establish a fluid path extending through said first opening, said first passage and said first port in said first member and outside of said flexible conduit.

11. A control valve comprising an elongated member having two oppositely longitudinally extending fluid passages isolated from each other, each passage terminating at its outer end in a separate opening and having a separate port in the surface of said elongated member, a slidable member slidably mounted on said elongated member in fluid-tight sealing engagement therewith, said slidable member having a port, and a flexible conduit secured at one end to said slidable member and communicating with said port in said slidable member and adapted to be connected at its other end to a source of fluid under a pressure different from that of the atmosphere, said slidable member being slidable on said elongated member from and to a first position in which said port in said slidable member is aligned with one port of said elongated member to and from a second position in which said port in said slidable member is aligned with the other port of said elongated member.

12. The apparatus of claim 1, comprising over-the-center means for moving said second member between said two positions on said first member.

* * * * *